US005650364A

United States Patent [19]

Münstedt et al.

[11] Patent Number: 5,650,364

[45] Date of Patent: Jul. 22, 1997

[54] SELF-OPACIFYING ENAMEL FRITS FOR THE ENAMELLING OF ALUMINUM OR ALUMINUM ALLOYS

[75] Inventors: Rainer Münstedt, Krefeld, Germany; Marc Leveaux, La Madeleine, France; Nancy Crevits, Lissewege, Belgium; Wolfgang Podestà, Brügge, Belgium; Antoine Dhaese, Lissewege, Belgium

[73] Assignee: Bayer Aktiengesellschaft, Leverkusen, Germany

[21] Appl. No.: 603,933

[22] Filed: Feb. 20, 1996

[30] Foreign Application Priority Data

Mar. 2, 1995 [DE] Germany ............ 195 07 216.2

[51] Int. Cl.[6] .................. C03C 8/02; C03C 8/14
[52] U.S. Cl. .................. 501/21; 501/24; 501/26; 501/20; 501/17; 501/77; 501/79
[58] Field of Search .................. 501/21, 24, 26, 501/73, 77, 79, 20, 17

[56] References Cited

U.S. PATENT DOCUMENTS

| 2,467,114 | 4/1949 | Deyrup . | |
|---|---|---|---|
| 2,925,351 | 2/1960 | Judd . | |
| 4,959,256 | 9/1990 | Piera | 428/144 |
| 5,266,357 | 11/1993 | Preuss et al. | 427/376.5 |
| 5,393,714 | 2/1995 | Thometzek et al. | 501/21 |

FOREIGN PATENT DOCUMENTS

| 0 522 401 | 1/1993 | European Pat. Off. . |
| 2 119 777 | 9/1972 | Germany . |
| 21 19 777 | 11/1972 | Germany . |
| 22 44 067 | 3/1974 | Germany . |
| 2 244 067 | 10/1975 | Germany . |
| 35 16 009 | 12/1985 | Germany . |
| 510448 | 4/1976 | Russian Federation . |
| 833628 | 5/1981 | Russian Federation . |
| 1 410 692 | 10/1975 | United Kingdom . |

OTHER PUBLICATIONS

Chem. Abs. 95: 174228g (1981).
Chem. Abs. 85: 36671p (1976).

*Primary Examiner*—Karl Group
*Attorney, Agent, or Firm*—Connolly and Hutz

[57] ABSTRACT

The present invention relates to self-opacifying enamel frit compositions that can be used for the enamelling of aluminium or aluminium alloys.

4 Claims, No Drawings

SELF-OPACIFYING ENAMEL FRITS FOR THE ENAMELLING OF ALUMINUM OR ALUMINUM ALLOYS

FIELD OF THE INVENTION

The present invention relates to self-opacifying enamel frits compositions that can be used for the enamelling of aluminum or aluminum alloys.

BACKGROUND AND PRIOR ART

Many enamel frit compositions that can be used for the enamelling of objects of aluminum are known from the literature (e.g. U.S. Pat. No. 2,467,114, DE 2 244 067, DE 2 119 777, U.S. Pat. No. 2,925,351, CA 85: 36671p, CA 95: 174228g). Highly opaque, self-opacifying and chemically resistant enamelling cannot, however, be produced with these known enamel frits. For this reason, use has hitherto been made of the additional admixture of titanium dioxide, for example, as opacifier to the so-called mill batch in order so to obtain opaque, chemically resistant enamelling on aluminum. This mill addition (up to 20 wt.%) in the form of, for example, titanium dioxide leads to the titanium dioxide dispersing finely in the enamelling and, as a result of the high scattering power of the titanium dioxide, to the enamel layer masking the metal base.

In contrast to enamel frits for the enamelling of aluminum, self-opacifying enamel frits based on titanium dioxide for steel have already existed for a relatively long time, but they cannot be applied to aluminum, since they crystallize at temperatures of 590° C. to 650° C.

SUMMARY OF THE INVENTION

It was the object of the present invention to make available enamel frits for aluminum or aluminum alloys, with which it is possible to produce self-opacifying, chemically resistant enamelling on aluminum without additional mill additions in the form of opacifiers being necessary during the preparation of the mill batch (slick).

This object was achieved with enamel frits of a quite special composition.

The invention provides self-opacifying, chemically resistant enamel frit compositions for the enamelling of aluminum or aluminum alloys with a thermal expansion coefficient of 460 to 475·$10^{-7}$ $K^{-1}$ and a glass transition temperature of 410° to 440° C., which are characterized in that they have substantially the following composition:

| | |
|---|---|
| 32 to 37 wt. % | $SiO_2$ |
| 0 to 4 wt. % | $B_2O_3$ |
| 0 to 3 wt. % | $Al_2O_3$ |
| 4 to 9 wt. % | $Li_2O$ |
| 10 to 18.5 wt. % | $Na_2O$ |
| 9 to 14 wt. % | $K_2O$ |
| 0 to 2 wt. % | MgO |
| 0 to 2 wt. % | SrO |
| 0 to 4 wt. % | BaO |
| 6 to 11 wt. % | $V_2O_5$ |
| 0 to 3 wt. % | $P_2O_5$ |
| 0 to 5 wt. % | $Sb_2O_3$ |
| 14 to 21 wt. % | $TiO_2$ |
| 0 to 2 wt. % | ZnO |
| 0 to 2 wt. % | $SnO_2$ |
| 0 to 1 wt. % | $MoO_3$ | wherein the ratio of [$TiO_2$+$Sb_2O_3$+$SnO_2$+ZnO+$Al_2O_3$] to [$Li_2O$+$Na_2O$+$K_2O$] amounts to 0.52 to 0.82.

DESCRIPTION OF PREFERRED EMBODIMENTS

The enamel frits preferably have the following composition:

| | |
|---|---|
| 32.5 to 36.4 wt. % | $SiO_2$ |
| 0 to 3.2 wt. % | $B_2O_3$ |
| 0.1 to 2.4 wt. % | $Al_2O_3$ |
| 4 to 8.5 wt. % | $Li_2O$ |
| 10 to 18.5 wt. % | $Na_2O$ |
| 9 to 14 wt. % | $K_2O$ |
| 0 to 1 wt. % | MgO |
| 0 to 1 wt. % | SrO |
| 0 to 2.5 wt. % | BaO |
| 7 to 10.4 wt. % | $V_2O_5$ |
| 1.8 to 2.9 wt. % | $P_2O_5$ |
| 0 to 4.1 wt. % | $Sb_2O_3$ |
| 14.2 to 20.4 wt. % | $TiO_2$ |
| 0 to 1.8 wt. % | ZnO |
| 0 to 2 wt. % | $SnO_2$ |
| 0 to 0.1 wt. % | $MoO_3$ | wherein the ratio of [$TiO_2$+$Sb_2O$+$SnO_2$+ZnO+$Al_2O_3$] to [$Li_2O$+$Na_2O$+$K_2O$] amounts to 0.52 to 0.82.

The enamel flits especially have the following composition:

| | |
|---|---|
| 32.5 to 36.4 wt. % | $SiO_2$ |
| 0 to 2.2 wt. % | $B_2O_3$ |
| 0.1 to 0.4 wt. % | $Al_2O_3$ |
| 5.5 to 7.5 wt. % | $Li_2O$ |
| 12 to 17.5 wt. % | $Na_2O$ |
| 10 to 13 wt. % | $K_2O$ |
| 0 to 2.5 wt. % | BaO |
| 7 to 10.4 wt. % | $V_2O_5$ |
| 1.8 to 2.3 wt. % | $P_2O_5$ |
| 0 to 4.1 wt. % | $Sb_2O_3$ |
| 16.3 to 20.4 wt. % | $TiO_2$ |
| 0 to 0.9 wt. % | ZnO |
| 0 to 1.9 wt. % | $SnO_2$ |
| 0 to 0.5 wt. % | $MoO_3$ | wherein the ratio of [$TiO_2$+$SnO_2$+$Sb_2O_3$+ZnO+$Al_2O_3$] to [$Li_2O$+$Na_2O$+$K_2O$] amounts to 0.56 to 0.82.

With the enamel frit compositions according to the invention, after the enamelling on aluminum a highly opaque, self-opacifying, white, chemically resistant enamel layer is obtained. This opaque enamel layer can be obtained without opacifiers having to be used in addition in the mill batch.

With the special enamel frit composition a recrystallization of a part of the $TiO_2$ present in the frit can be achieved even at low temperatures (520° to 570° C.), so that an opaque white enamel layer can be produced during the enamelling at firing temperatures of 520° to 570° C.

Through the use of the enamel frit compositions according to the invention it is no longer necessary to admix opacifiers in addition to the mill batch. The mill batch is thereby better handleable and no longer as unstable as previously.

The enamel flits according to the invention can be applied for example by wet application to aluminium in the form of the so-called mill batch together with other mill additions to the aluminum substrate. Preferably 100 parts by weight of the enamel frit according to the invention, 2 to 10 parts by weight of auxiliary substances, 0 to 15 parts by weight of additional opacifiers, 0 to 15 parts by weight of pigments and 50 to 65 parts by weight of water are used in the mill batch.

After application of the mill batch to the aluminum subtrate the latter is fired at temperatures between 520° and 570° C. A self-opacifying enamel layer is obtained that has a high hiding (covering) power and a high chemical stability.

The enamelling produced with the enamel frits according to the invention has a high acid resistance as well as a high hiding power. Furthermore, it shows no tendency, even after many days at very high temperatures, to discoloration (in particular not to greying or yellowing). In addition, relatively thin enamel layers can be produced with the enamel flits according to the invention without in doing so the acid resistance being influenced adversely or the hiding power being no longer adequate. The relatively thin enamel layers have the great advantage that cracking or deformations or other surface defects do not occur or occur less after enamelling and cooling.

The enamel frits according to the invention can be manufactured according to the known processes. The starting materials for the corresponding oxide components in the enamel frit composition are mixed, thereafter melted and then chilled in water. The oxides of the enamel frit components or other compounds that change into the oxides during the melting process are used as starting compounds.

During wet application to an aluminum substrate the enamel frits according to the invention are mixed with other components in the so-called mill batch and subsequently sprayed onto the substrate, or the substrate is dipped in the mill batch. Usually used as mill additions are auxiliary substances (boric acid, potassium hydroxide, sodium silicate, silica gel and/or carboxymethylcellulose), optionally additional opacifiers ($TiO_2$, $SnO_2$, $Sb_2O_3$, ZnO, $ZrO_2$, $ZrSiO_4$) and optionally pigments. After optional drying, firing is normally carried out at 520°–570° C. for 2 to 8 minutes.

The invention will be illustrated in more detail with the aid of the following examples.

EXAMPLES

Preparation of the Enamel Frits

The various enamel frits were prepared by mixing and melting of the appropriate starting materials in an electric melting furnace. After the melting process the particular glass melt was chilled in water. The melting process was carded out in each case at 1100 to 1150 for 15 to 30 minutes. The compositions of the molten frits can be taken from Tables 1 and 2.

Preparation of the Mill Batches 100 parts by weight of the enamel frits prepared as above are mixed in each case with 4 parts by weight boric acid, 1 part by weight sodium silicate and 50 parts by weight water. The mixture is ground until the particles have reached such a size that no more than 2% remain on a sieve of mesh size 38 μm. The mixture thus prepared are used for the enamelling of the aluminum substrates. In further experiments up to 15 parts by weight of opacifiers in addition are mixed with the mill batches.

Preparation of the Enamelling

The mill batches prepared as above are applied to aluminum sheets in such an amount that after the enamelling a layer with a thickness between 50 and 100 microns, preferably between 60 and 80 microns, is present. After the application of the mill batches to the aluminum sheets the latter are dried and subsequently fired at temperatures between 520° and 570° C. The firing process lasts for 2 to 8 minutes.

The enamel frits 1 to 27 according to the invention (Table 1) provide enamel layers with good chemical resistance and hiding power. The self-opacifying effect of these enamel layers is good and is intensified by the additional opacifiers in the mill batch. A thickness of the enamel layer of 50 to 60 μm is sufficient. The frits A to P according to the prior art (Table 2) provide enamel layers without hiding power. Only with the use of 15 parts by weight and more of opacifier in the mill batch and a thickness of the enamel layer of 80 μm and more is an enamelling with good hiding power obtained.

If the frits according to the invention (e.g. 1, 5, 11, 21 and 24) are applied to aluminum according to the above directions but fired at temperatures between 480° C. and 500° C., the enamelling shows no or only weak self-opacification.

The frits 1 to 27 according to the invention are applied to aluminum according to the above directions and fired. The resulting enamelled aluminum sheets are kept in a furnace for 20 days at 360° C. After cooling-down the discoloration is measured. The enamelling produced with the frits 1 to 27 according to the invention shows no discoloration, while the enamelling produced with the frits A to P, not according to the invention, has discolorations.

TABLE 1

|  | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $SiO_2$ | 34,9 | 35,1 | 35,2 | 34,4 | 34,1 | 34,8 | 35,1 | 34,8 | 34,7 | 34,4 | 34,4 | 34,4 | 34,4 | 34,5 |
| $B_2O_3$ | 1,3 | 1,3 | 1,3 | 1,3 | 1,9 | 1,3 | 0 | 0,7 | 0,6 | 1,3 | 1,3 | 1,3 | 1,3 | 1,3 |
| $Al_2O_3$ | 2,4 | 1,4 | 0,4 | 2,3 | 0,1 | 0,4 | 0,1 | 0,1 | 0,4 | 0,4 | 0,4 | 0,4 | 0,4 | 0,1 |
| $Na_2O$ | 15,5 | 15,6 | 15,6 | 15,3 | 15,5 | 15,5 | 15,1 | 15,2 | 15,2 | 17,3 | 15,3 | 15,3 | 15,3 | 15,4 |
| $K_2O$ | 10,2 | 11 | 11 | 10,8 | 10,7 | 10,9 | 11 | 10,9 | 10,9 | 10,8 | 10,8 | 10,8 | 10,8 | 10,8 |
| $Li_2O$ | 6,8 | 6,8 | 6,8 | 6,7 | 6,7 | 6,8 | 6,9 | 6,8 | 6,7 | 4,7 | 6,7 | 6,7 | 6,7 | 6,7 |
| BaO | 1,8 | 1,8 | 1,8 | 1,8 | 1,8 | 1,8 | 1,8 | 1,8 | 1,8 | 1,8 | 1,8 | 0 | 1,8 | 1,8 |
| $Sb_2O_3$ | 2,3 | 2,3 | 0 | 2,2 | 2,2 | 2,3 | 2,2 | 2,2 | 2,3 | 2,2 | 2,2 | 2,2 | 2,2 | 2,2 |
| $V_2O_5$ | 7,7 | 7,8 | 7,8 | 7,6 | 7,6 | 7,7 | 7,8 | 7,7 | 7,4 | 7,6 | 7,6 | 7,6 | 7,6 | 7 |
| $P_2O_5$ | 2,3 | 2,3 | 2,3 | 2,3 | 2,3 | 2,3 | 2,4 | 2,3 | 2,6 | 2,3 | 2,3 | 2,3 | 1,8 | 2,9 |
| $TiO_2$ | 14,2 | 14,6 | 17,6 | 15,3 | 17,1 | 14,2 | 17,6 | 17,4 | 17,4 | 17,2 | 17,2 | 17,2 | 17,2 | 17,3 |
| $SnO_2$ | 0 | 0 | 0 | 0 | 0 | 0 | 0 | 0 | 0 | 0 | 0 | 0 | 0 | 0 |
| ZnO | 0 | 0 | 0 | 0 | 0 | 0 | 0 | 0 | 0 | 0 | 0 | 1,8 | 0 | 0 |
| MgO | 0 | 0 | 0 | 0 | 0 | 0 | 0 | 0 | 0 | 0 | 0 | 0 | 0,5 | 0 |
| Summe | 100,1 | 100,0 | 99,8 | 100,0 | 100,0 | 100,0 | 100,0 | 99,9 | 100,0 | 100,0 | 100,0 | 100,0 | 100,0 | 100,0 |
| $Li_2O/R_2O$ | 0,209 | 0,204 | 0,204 | 0,204 | 0,204 | 0,205 | 0,209 | 0,207 | 0,204 | 0,143 | 0,204 | 0,204 | 0,204 | 0,204 |
| $X/R_2O$ | 0,536 | 0,545 | 0,566 | 0,573 | 0,644 | 0,596 | 0,600 | 0,617 | 0,619 | 0,631 | 0,631 | 0,631 | 0,631 | 0,632 |

|  | 15 | 16 | 17 | 18 | 19 | 20 | 21 | 22 | 23 | 24 | 25 | 26 | 27 |
|---|---|---|---|---|---|---|---|---|---|---|---|---|---|
| $SiO_2$ | 33,7 | 34,2 | 34,1 | 33,9 | 34,5 | 34,4 | 33,7 | 34,4 | 33,8 | 33,1 | 33,1 | 32,9 | 32,5 |

TABLE 1-continued

| | | | | | | | | | | | | | |
|---|---|---|---|---|---|---|---|---|---|---|---|---|---|
| $B_2O_3$ | 1,2 | 1,3 | 1,3 | 1,3 | 2,2 | 1,1 | 1,3 | 3,2 | 0 | 1,2 | 1,3 | 1,8 | 1,2 |
| $Al_2O_3$ | 2,3 | 0,4 | 0,4 | 0,4 | 0,3 | 0,3 | 0,4 | 0,3 | 0,1 | 0,4 | 0,4 | 0,1 | 0,4 |
| $Na_2O$ | 15 | 15 | 14,8 | 14,5 | 13,1 | 12,9 | 15 | 12,4 | 14,5 | 14,7 | 12,8 | 14,9 | 14,4 |
| $K_2O$ | 10,6 | 10,8 | 10,9 | 10,9 | 12,7 | 12,6 | 10,6 | 12,6 | 10,6 | 10,4 | 10,4 | 10,3 | 10,2 |
| $Li_2O$ | 6,5 | 6,7 | 6,7 | 6,7 | 6,3 | 6,3 | 6,5 | 6,3 | 6,5 | 6,4 | 8,3 | 6,4 | 6,3 |
| BaO | 1,7 | 1,8 | 1,8 | 1,8 | 0 | 0 | 1,8 | 0 | 1,7 | 1,7 | 1,7 | 1,7 | 1,7 |
| $Sb_2O_3$ | 4,1 | 2,3 | 2,3 | 2,3 | 0 | 1,5 | 2,2 | 0 | 4,1 | 2,2 | 4 | 4 | 4 |
| $V_2O_5$ | 7,5 | 7,7 | 7,7 | 7,7 | 9,9 | 9,9 | 7,5 | 9,8 | 7,6 | 7,4 | 7,4 | 7,4 | 7,2 |
| $P_2O_5$ | 2,2 | 2,3 | 2,3 | 2,3 | 1,8 | 1,8 | 2,2 | 1,8 | 2,2 | 2,2 | 2,2 | 2,2 | 2,2 |
| $TiO_2$ | 15 | 17,3 | 17,4 | 17,5 | 19,2 | 19,2 | 16,9 | 19,2 | 18,9 | 18,5 | 18,5 | 18,4 | 20 |
| $SnO_2$ | 0 | 0 | 0 | 0 | 0 | 0 | 1,9 | 0 | 0 | 1,9 | 0 | 0 | 0 |
| ZnO | 0 | 0 | 0 | 0 | 0 | 0 | 0 | 0 | 0 | 0 | 0 | 0 | 0 |
| MgO | 0 | 0,4 | 0,8 | 1,2 | 0 | 0 | 0 | 0 | 0 | 0 | 0 | 0 | 0 |
| Summe | 99,8 | 100,2 | 100,5 | 100,5 | 100,0 | 100,0 | 100,0 | 100,0 | 100,0 | 100,1 | 100,1 | 100,1 | 100,1 |
| $Li_2O/R_2O$ | 0,202 | 0,206 | 0,207 | 0,209 | 0,196 | 0,198 | 0,202 | 0,201 | 0,206 | 0,203 | 0,263 | 0,203 | 0,204 |
| $X/R_2O$ | 0,632 | 0,643 | 0,648 | 0,648 | 0,657 | 0,667 | 0,686 | 0,695 | 0,716 | 0,728 | 0,756 | 0,756 | 0,816 |

$X = Al_2O_3 + Sb_2O_3 + TiO_2 + SnO_2 + ZnO$
$R_2O = Na_2O + K_2O + Li_2O$
All data in wt. %

TABLE 2

| | A | B | C | D | E | F | G | H | I | J | K | L | M | N | O | P |
|---|---|---|---|---|---|---|---|---|---|---|---|---|---|---|---|---|
| $SiO_2$ | 33,6 | 35,1 | 33,1 | 34,4 | 34,1 | 35,1 | 33,1 | 33,2 | 32,9 | 32,5 | 32,5 | 34,4 | 31,5 | 35,1 | 32,9 | 31,5 |
| $B_2O_3$ | 1,1 | 1,3 | 1,3 | 1,3 | 1,3 | 1,3 | 1,2 | 2 | 0 | 1,2 | 1,2 | 1,3 | 0 | 1,3 | 0 | 0 |
| $Al_2O_3$ | 0,6 | 0,4 | 0,4 | 0,4 | 3,8 | 0,4 | 0,4 | 0,1 | 1,1 | 0,4 | 2,2 | 0,4 | 0,1 | 0,4 | 1,1 | 0,1 |
| $Na_2O$ | 18 | 13,6 | 12,8 | 15,3 | 15,1 | 19,6 | 14,7 | 21,5 | 13,6 | 14,4 | 14,4 | 17,3 | 15,1 | 19,6 | 17,6 | 19,1 |
| $K_2O$ | 12 | 11 | 10,4 | 10,8 | 10,7 | 7 | 10,4 | 12,1 | 10 | 10,2 | 10,2 | 10,8 | 10,6 | 11 | 10 | 10,6 |
| $Li_2O$ | 2,5 | 8,8 | 8,3 | 6,7 | 6,6 | 6,8 | 6,4 | 1,8 | 7,8 | 6,3 | 6,3 | 4,7 | 5,4 | 2,8 | 3,8 | 1,4 |
| BaO | 0 | 1,8 | 1,7 | 1,8 | 1,7 | 1,8 | 1,7 | 0 | 1,7 | 1,7 | 1,7 | 1,8 | 5,9 | 1,8 | 1,7 | 5,9 |
| $Sb_2O_3$ | 0 | 2,3 | 4 | 0 | 2,2 | 2,3 | 0 | 0 | 0 | 2,1 | 2,1 | 2,2 | 0 | 2,3 | 0 | 0 |
| $V_2O_5$ | 9,3 | 7,6 | 7,4 | 7,6 | 7,6 | 7,8 | 7,4 | 4,6 | 8 | 7,2 | 7,2 | 7,6 | 4 | 7,6 | 8 | 4 |
| $P_2O_5$ | 2,2 | 2,3 | 2,2 | 2,3 | 2,2 | 2,3 | 2,2 | 2,3 | 1,6 | 2,2 | 2,2 | 2,3 | 0,1 | 2,3 | 1,6 | 0,1 |
| $TiO_2$ | 20,7 | 15,6 | 18,5 | 15,3 | 15,1 | 15,6 | 18,5 | 22,4 | 23,3 | 20 | 20 | 17,2 | 21,1 | 15,6 | 23,3 | 21,1 |
| $SnO_2$ | 0 | 0 | 0 | 4,2 | 0 | 0 | 4,1 | 0 | 0 | 1,9 | 0 | 0 | 5 | 0 | 0 | 5 |
| ZnO | 0 | 0 | 0 | 0 | 0 | 0 | 0 | 0 | 0 | 0 | 0 | 0 | 0 | 0 | 0 | 0 |
| MgO | 0 | 0 | 0 | 0 | 0 | 0 | 0 | 0 | 0 | 0 | 0 | 0 | 0 | 0 | 0 | 0 |
| $MoO_3$ | 0 | 0 | 0 | 0 | 0 | 0 | 0 | 0 | 0 | 0 | 0 | 0 | 1 | 0 | 0 | 1 |
| Summe | 100,0 | 99,8 | 100,1 | 100,1 | 99,9 | 100,0 | 100,1 | 100,0 | 100,0 | 100,1 | 100,0 | 100,0 | 99,8 | 99,80 | 100,0 | 99,8 |
| $Li_2O/R_2O$ | 0,077 | 0,263 | 0,263 | 0,204 | 0,204 | 0,204 | 0,203 | 0,051 | 0,248 | 0,204 | 0,204 | 0,143 | 0,174 | 0,084 | 0,121 | 0,045 |
| $X/R_2O$ | 0,655 | 0,548 | 0,727 | 0,607 | 0,636 | 0,548 | 0,730 | 0,636 | 0,777 | 0,790 | 0,786 | 0,604 | 0,842 | 0,548 | 0,777 | 0,842 |

$X = Al_2O_3 + Sb_2O_3 + TiO_2 + SnO_2 + ZnO$
$R_2O = Na_2O + K_2O + Li_2O$
All data in wt. %

We claim:

1. A self-opacifying and chemically resistant enamel frit composition for the enamelling of aluminum or aluminum alloys with a thermal expansion coefficient of 460 to 475·$10^{-7}$ $K^{-1}$ and a glass transition temperature of 410° to 440° C., consisting of:

| | |
|---|---|
| 32 to 37 wt. % | $SiO_2$ |
| 0 to 4 wt. % | $B_2O_3$ |
| 0 to 3 wt. % | $Al_2O_3$ |
| 4 to 9 wt. % | $Li_2O$ |
| 10 to 18.5 wt. % | $Na_2O$ |
| 9 to 14 wt. % | $K_2O$ |
| 0 to 2 wt. % | MgO |
| 0 to 2 wt. % | SrO |
| 0 to 4 wt. % | BaO |
| 6 to 11 wt. % | $V_2O_5$ |
| 0 to 3 wt. % | $P_2O_5$ |
| 0 to 5 wt. % | $Sb_2O_3$ |
| 14 to 21 wt. % | $TiO_2$ |
| 0 to 2 wt. % | ZnO |
| 0 to 2 wt. % | $SnO_2$ |
| 0 to 1 wt. % | $MoO_3$ | wherein the ratio of $[TiO_2+Sb_2O_3+SnO_2+ZnO+Al_2O_3]$ to $[Li_2O+Na_2O+K_2O]$ amounts to 0.52 to 0.82.

2. Slip for enamelling on aluminum or aluminum alloys, characterized in that the slip has the following composition:

100 parts by weight of an enamel frit having the following composition:

| | |
|---|---|
| 32 to 37 wt. % | $SiO_2$ |
| 0 to 4 wt. % | $B_2O_3$ |
| 0 to 3 wt. % | $Al_2O_3$ |
| 4 to 9 wt. % | $Li_2O$ |
| 10 to 18.5 wt. % | $Na_2O$ |
| 9 to 14 wt. % | $K_2O$ |
| 0 to 2 wt. % | MgO |
| 0 to 2 wt. % | SrO |
| 0 to 4 wt. % | BaO |
| 6 to 11 wt. % | $V_2O_5$ |
| 0 to 3 wt. % | $P_2O_5$ |
| 0 to 5 wt. % | $Sb_2O_3$ |
| 14 to 21 wt. % | $TiO_2$ |
| 0 to 2 wt. % | ZnO |
| 0 to 2 wt. % | $SnO_2$ | wherein the ratio of $[TiO_2+Sb_2O_3+SnO_2+ZnO+Al_2O_3]$ to $[Li_2O+Na_2O+K_2O]$ amounts to 0.52 to 0.82;

| | |
|---|---|
| 0 to 15 | parts by weight opacifier; |
| 2 to 10 | parts by weight auxiliary substances; |
| 0 to 15 | parts by weight pigments; and |
| 50 to 65 | parts by weight water. |

3. Enamel frit composition according to claim 1, characterized in that the frit has the following composition:

| | |
|---|---|
| 32.5 to 36.4 wt. % | $SiO_2$ |
| 0 to 3.2 wt. % | $B_2O_3$ |
| 0.1 to 2.4 wt. % | $Al_2O_3$ |
| 4 to 8.5 wt. % | $Li_2O$ |
| 10 to 18.5 wt. % | $Na_2O$ |
| 9 to 14 wt. % | $K_2O$ |
| 0 to 1 wt. % | $MgO$ |
| 0 to 1 wt. % | $SrO$ |
| 0 to 2,5 wt. % | $BaO$ |
| 7 to 10.4 wt. % | $V_2O_5$ |
| 1.8 to 2.9 wt. % | $P_2O_5$ |
| 0 to 4.1 wt. % | $Sb_2O_3$ |
| 14.2 to 20.4 wt. % | $TiO_2$ |
| 0 to 1.8 wt. % | $ZnO$ |
| 0 to 2 wt. % | $SnO_2$ |
| 0 to 0.1 wt. % | $MoO_3$ | wherein the ratio of $[TiO_2+Sb_2O_3+SnO_2+ZnO+Al_2O_3]$ to $[Li_2O+Na_2O+K_2O]$ amounts to 0.53 to 0.82.

4. Enamel frit compositions according to claim 1, characterized in that the frit has the following composition:

| | |
|---|---|
| 32.5 to 36.4 wt. % | $SiO_2$ |
| 0 to 2.2 wt. % | $B_2O_3$ |
| 0.1 to 0.4 wt. % | $Al_2O_3$ |
| 5.5 to 7.5 wt. % | $Li_2O$ |
| 12 to 17.5 wt. % | $Na_2O$ |
| 10 to 13 wt. % | $K_2O$ |
| 0 to 2.5 wt.% | $BaO$ |
| 7 to 10.4 wt. % | $V_2O_5$ |
| 1.8 to 2.3 wt. % | $P_2O_5$ |
| 0 to 4.1 wt. % | $Sb_2O_3$ |
| 16.3 to 20.4 wt. % | $TiO_2$ |
| 0 to 0.9 wt. % | $ZnO$ |
| 0 to 1.9 wt. % | $SnO_2$ |
| 0 to 0.5 wt. % | $MoO_3$ | wherein the ratio of $[TiO_2+SnO_2+Sb_2O_3+ZnO+Al_2O_3]$ to $[Li_2O+Na_2O+K_2O]$ amounts to 0.56 to 0.82.

\* \* \* \* \*